United States Patent [19]
Miller

[11] Patent Number: 5,427,194
[45] Date of Patent: Jun. 27, 1995

[54] ELECTROHYDRAULIC VEHICLE WITH BATTERY FLYWHEEL

[76] Inventor: Edward L. Miller, 3501 Woolman Dr., Haymarket, Va. 22069

[21] Appl. No.: 191,538

[22] Filed: Feb. 4, 1994

[51] Int. Cl.⁶ .............................................. B60K 6/00
[52] U.S. Cl. .................................. 180/165; 180/65.2; 180/65.3
[58] Field of Search ............... 180/165, 65.2, 65.3, 180/65.4, 308, 242; 280/217

[56] References Cited

U.S. PATENT DOCUMENTS

| | | | |
|---|---|---|---|
| 2,589,454 | 10/1948 | Storsand | 310/89 |
| 3,497,026 | 12/1967 | Calvert | 180/165 |
| 4,042,056 | 8/1977 | Horwinski | 180/65.2 |
| 4,098,144 | 7/1978 | Besel et al. | 180/65.2 |
| 4,218,624 | 8/1980 | Schiavone | 290/45 |
| 4,629,947 | 12/1986 | Hammerslag et al. | 318/161 |
| 4,888,949 | 12/1989 | Rogers | 180/165 |
| 5,064,013 | 11/1990 | Lenz | 180/308 |

FOREIGN PATENT DOCUMENTS

| | | | |
|---|---|---|---|
| 2237896 | 2/1974 | Germany | 180/165 |
| 2444564 | 4/1976 | Germany | 180/65.2 |
| 2138171 | 10/1984 | United Kingdom | 280/217 |

*Primary Examiner*—Brian L. Johnson
*Assistant Examiner*—Min Yu
*Attorney, Agent, or Firm*—Terrance L. Siemens

[57] ABSTRACT

A flywheel with electric batteries mounted thereon is provided for an electrical vehicle. The flywheel incorporates the weight of the batteries to store kinetic energy. The flywheel is suspended by magnetic force and is rotated about a central flywheel shaft. The flywheel shaft is fitted with an electric drive motor, a hydraulic pump and a generator. The electric vehicle utilizes the energy stored in the spinning flywheel to supply peak electrical demand during the acceleration of the vehicle. When the vehicle stops the flywheel energy recharges the electrical batteries. The flywheel is driven by the electric drive motor. The hydraulic pump is used to drive a hydraulic motor which in turn drives the vehicle wheels. When the hydraulic motor brakes the wheels, kinetic energy is stored into the flywheel. The generator supplies supplemental vehicle power.

10 Claims, 2 Drawing Sheets

ELECTROHYDRAULIC VEHICLE WITH BATTERY FLYWHEEL

BACKGROUND OF THE INVENTION

1. Field of the Invention

The present invention relates generally to electric vehicles and their energy utilization and storage. More specifically, it relates to a flywheel system incorporating batteries as part of the flywheel mass especially adapted to effect the storage of kinetic energy which may be drawn upon to support peak hydraulic or electrical demands of the vehicle. The flywheel is suspended by magnetic levitation to reduce friction and is balanced by a plurality of adjustable weights.

The vehicle is basically driven by electrical energy which is stored in galvanic cells or batteries. Torque and speed balancing are accomplished by a hydrostatic transmission. The principles of this invention can be used in any machine having numerous peak power requirements with an overall lower average power requirement. Work and transportation vehicles are probably the most prevalent machine of this nature presently in widespread use. The pollution free vehicle of this invention will contribute substantially to the field of pollution control. Of course, the field of transportation is the major benefactor of this invention.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses.

2. Description of the Prior Art

Devices for electric propulsion of vehicles are old and well known in the art. The use of flywheels in vehicles is also old and well known in the art. Some instances of electrical vehicles utilizing flywheels are known in the art. Recently, rather limited performance solar powered vehicles have been developed in which solar power is converted to electrical energy which in turn is used to power the electric vehicle. In accordance with conventional terminology, the term electric vehicle used herein may be taken to mean a vehicle deriving its primary means of motivation either directly or indirectly from electrical energy stored on and carried by the vehicle. The following known prior art has been directed to providing electric drive vehicle technology. As will be seen, the simplicity and effectiveness of my invention is not rivaled in the prior art.

U.S. Pat. No. 2,589,454 issued to Storsand on Mar. 18, 1952, discloses a flywheel energy storage system especially for electric vehicles. The housing for the flywheel is filled with a gas such as hydrogen to minimize friction losses to normal atmosphere. In contrast to my invention, the flywheel does not include batteries comprising part of the flywheel mass. Also, the flywheel electric vehicle of Storsand does not contemplate the use of hydraulic power for provision of high torque capability.

U.S. Pat. No. 4,218,624 issued to Schiavone on Aug. 19, 1980, discloses an electric vehicle utilizing a flywheel. In this device, batteries power an electric drive motor which in turn drives the wheels via a transmission system. The flywheel is used to charge the batteries. A self contained electrical generation system is powered by the roughness of the terrain being traversed. In contrast to my invention, the flywheel does not include batteries comprising part of the flywheel mass. Also, the flywheel electric vehicle of Schiavone does not contemplate the use of hydraulic power for provision of high torque capability. The device of Schiavone would be rough riding because its draining of energy from the intended vibration absorption system would, of necessity, decrease the efficiency of that system in achieving its intended goals.

U.S. Pat. No. 4,388,977 issued to Bader on Jun. 21, 1983, discloses an electric drive system employing a flywheel. This system is to be implemented with an external energy source such as those in use with trolleys. No batteries are employed for energy storage. By contrast, the device of the instant invention is a true mobile vehicle not requiring constant connection to an external power source for operation.

U.S. Pat. No. 4,629,947 issued to Hammerslag et al. on Dec. 16, 1986, discloses an electric vehicle drive system. The system employs batteries in order to drive an electric drive motor portion of a motor-generator. A flywheel is provided to supply energy during peak load. The flywheel is mounted in vacuum housing. In contrast to my invention, the flywheel does not include batteries comprising part of the flywheel mass. Also, the flywheel electric vehicle of Hammerslag does not contemplate the use of hydraulic power for provision of high torque capability.

U.S. Pat. No. 3,497,026 issued to Calvert on Feb. 24, 1970, discloses an electric vehicle drive system incorporating a flywheel. The flywheel includes dry storage batteries for additional weight. A movable friction drive, riding directly on the flywheel, is used for the mechanical transmission of power to the vehicle wheels. In contrast to the present invention, the system of Calvert does not employ hydraulic power for the provision of high torque capability. Also, the flywheel batteries of Calvert are not mounted to the flywheel in a manner that would allow the use of wet cell batteries as contemplated by the instant invention.

Thus, while the foregoing body of prior art indicates it to be well known to use flywheel systems in electrical vehicles, the provision of a device which utilizes battery mass coupled with magnetic levitation of the flywheel is not contemplated. Nor does the prior art described above teach or suggest an electric vehicle utilizing a hydraulic system coupled to the flywheel to drive the vehicle and to replace kinetic energy back into the flywheel as the result of braking. The foregoing disadvantages are overcome by the unique electric vehicle energy storage and transmission system of the present invention as will be made apparent from the following description thereof. Other advantages of the present invention over the prior art also will be rendered evident.

None of the above inventions and patents, taken either singly or in combination, is seen to describe the instant invention as claimed.

SUMMARY OF THE INVENTION

To achieve the foregoing and other advantages, the present invention, briefly described, provides a flywheel which has electrical batteries mounted thereon which provides electrical energy and kinetic energy for an electrical vehicle. The flywheel incorporates the weight of the batteries to store kinetic energy. The flywheel is suspended by magnetic force and is rotated about a central flywheel shaft. The flywheel shaft is fitted with an electric drive motor, a hydraulic pump and a generator. The electric vehicle utilizes the energy stored in the spinning flywheel to supply peak electrical demand during the acceleration of the vehicle. When the vehicle stops the flywheel energy recharges the electrical batteries. The flywheel is driven by the electric drive motor. The hydraulic pump is used to drive a hydraulic motor which in turn drives the vehicle wheels. The hydraulic pump utilizes kinetic energy stored in the flywheel to drive the hydraulic motor systems. When the hydraulic motor brakes the vehicle, kinetic energy is returned through the wheels and stored into the flywheel. The generator supplies supplemental vehicle power. The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

Accordingly, it is a principal object of the invention to provide a new and improved electrohydraulic vehicle with a battery flywheel which overcomes the disadvantages of the prior art in a simple but effective manner.

It is a major object of this invention to provide a battery flywheel for an electrohydraulic vehicle which may be easily and efficiently manufactured and marketed.

It is another object of the invention to provide a new and improved flywheel battery for an electrohydraulic vehicle which is of durable and reliable construction.

Still yet a further object of the present invention is to provide a new and improved flywheel battery for an electrohydraulic vehicle which utilizes a flywheel suspended by magnetic levitation.

It is still a further object of the present invention to provide a new and improved electrohydraulic powered vehicle which utilizes a hydraulic drive system which utilizes kinetic energy when accelerating and replaces kinetic energy when decelerating or braking.

It is another object of the invention to provide a battery flywheel which is maintained in an efficient bracketed speed range by a automatic flywheel speed control system.

It is another object of the invention to provide a battery flywheel which is flexibly mounted and automatically balanced in operation.

It is another object of the invention to provide a battery flywheel which utilizes conventional wet cell batteries as are currently used in standard automotive vehicles.

It is another object of the invention to provide an electrohydraulic vehicle with a battery flywheel having a dual buffering of the electric drive motor from peak loads imposed by the vehicle, with the first level of buffering being a hydraulic energy accumulation system, and the second level of buffering being the flywheel kinetic energy accumulation system.

Finally, it is a general goal of the invention to provide improved elements and arrangements thereof in an apparatus for the purposes described which is inexpensive, dependable and fully effective in accomplishing its intended purposes.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
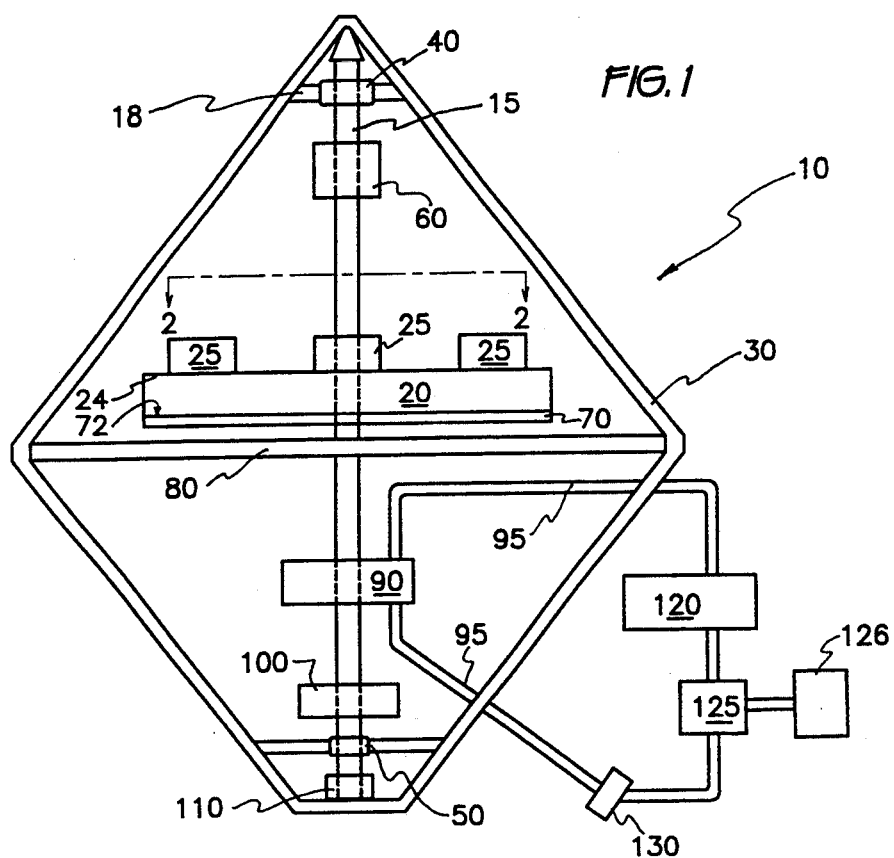
FIG. 1 is an elevation view showing, somewhat schematically, a general diagram of a first preferred embodiment of the flywheel battery for an electric powered vehicle.

The electrohydraulic vehicle of the present invention is generally designated by arrow 10 of FIG. 1. The device comprises the following main parts; (1) a flywheel 20 using the weight of electric batteries as a primary source of kinetic energy, (2) an electric drive motor 60 used to maintain a desired flywheel shaft RPM, (3) a main hydraulic pump 90 driven by the flywheel shaft used to provide pressurized hydraulic fluid, and (4) individual hydraulic wheel motors 125 used to propel vehicle wheels 126.

Figure 2:
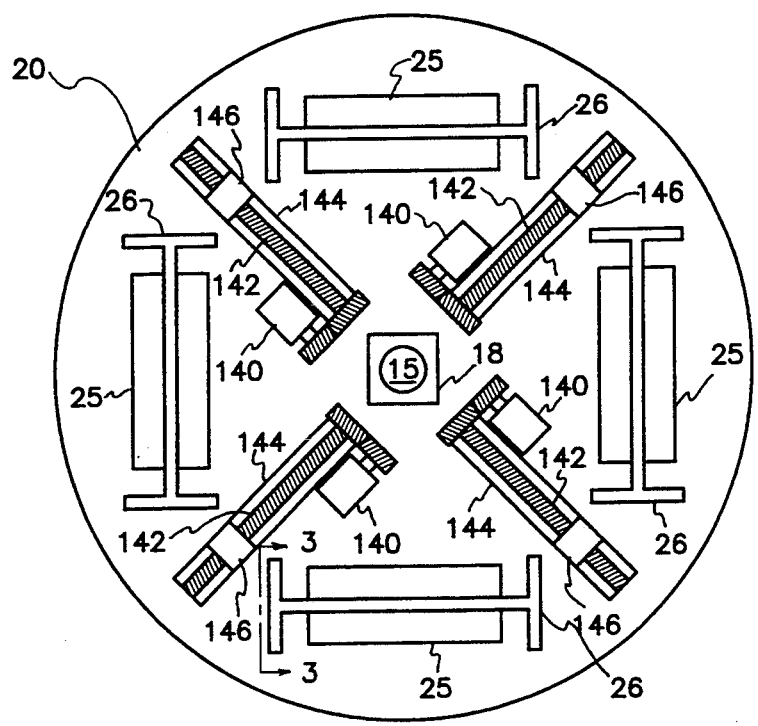
FIG. 2 is a top view of the self balancing flywheel battery of the preferred embodiment taken along line 2—2 of FIG. 1.
Figure 3:
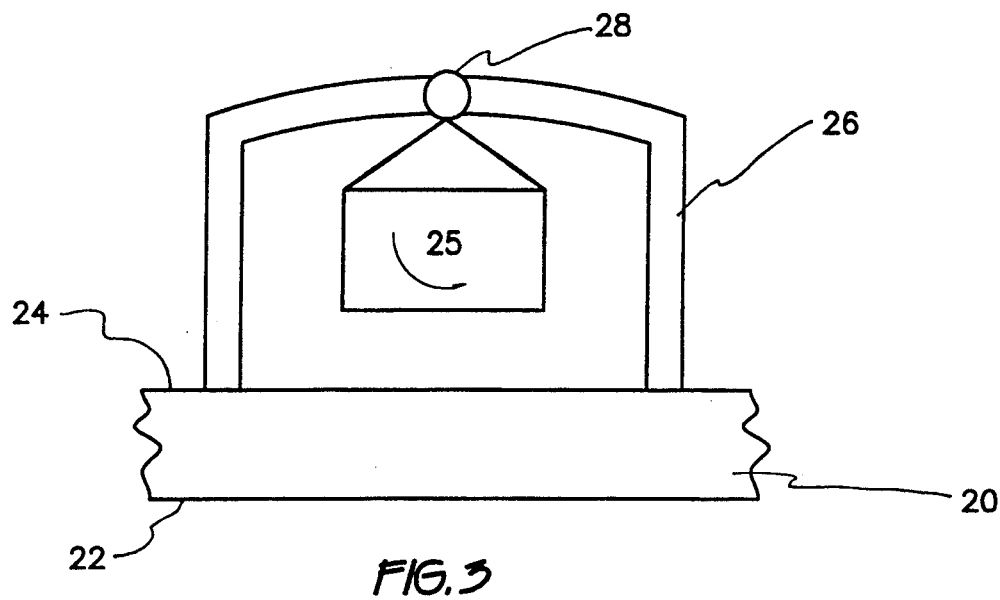
FIG. 3 is an elevation view of a suspended battery carrier of the preferred embodiment shown in FIG. 2 taken along 3—3 of FIG. 2.

With reference now to the drawings, a new and improved flywheel battery for an electric vehicle embodying the principles and concepts of the present invention will be described. Turning initially to FIGS. 1–3, there is shown a first exemplary embodiment of the instant invention. In its preferred form, the flywheel battery for an electrical vehicle 10 comprises generally a horizontally oriented cylindrical disk flywheel 20 with a number of electric batteries 25 mounted thereon. The flywheel 20 is mounted for rotation with a central shaft 15. Central shaft 15 is supported by an upper housing bearing 40 and a lower housing bearing 50. A thrust bearing 110 is provided beneath the lower housing bearing 50 to help support the shaft 15 and all of the objects attached to the shaft 15. Additional support for the weight of the flywheel proper is provided by magnetic levitation means 70, 80 to be described more fully later. A gimbals housing 30 is provided to which upper housing bearing 40, the lower housing bearing 50 and the thrust bearing 110 are secured.

An electric drive motor 60 is secured to the shaft 15. The electric drive motor 60 is used to maintain the desired flywheel shaft RPM. The motor is primarily powered by electrical storage batteries 25 except when they are being charged, such as prior to vehicle start up. It is recognized that wiring (not shown) must be used to conduct electrical energy from batteries 25 to motor 60, spinning with the flywheel, to motor 60. Conventional slip rings would be sufficient for this function. Also, the batteries may be charged with a conventional charger (not shown) when the vehicle is not in use. At such times the initial flywheel start up may be accomplished by a static power source (not shown), thus conserving the battery energy.

The flywheel 20 has an upper permanent magnet or series of magnets 70 secured to the under side 22. A lower permanent magnet or series of magnets 80 are secured about shaft 15 and on a horizontal portion of gimbals housing 30 so as to underlie magnets 70 on the underside of the flywheel. The upper permanent magnet 70 is oriented positive pole downward. The lower permanent magnet is oriented positive pole upward. Since like magnetic fields repel, the flywheel 15 is thus suspended by magnetic levitation. This magnetic levitation reduces flywheel friction and the amount of weight required to be supported by thrust bearing 110.

A main hydraulic motor (pump) 90 is secured to the shaft 15. The turning shaft 15 causes the pump to rotate and generate pressure in the hydraulic fluid. A second set of four hydraulic motors (pumps) 125 are provided (only one shown) connected to the central motor by hydraulic tube 95. A combined fluid reservoir and hydraulic accumulator system 120 and a control valve 130 are provided as part of the hydraulic system being integral thereto and connected thereto by hydraulic tubes 95. The wheel hydraulic motors(pumps) 125 are used to both accelerate and brake the wheels 126 in the manner of conventional hydrostatic drives.

The kinetic energy stored in the spinning flywheel 20 can supply a tremendous amount of torque to the main hydraulic pump which can provide a large volume of pressurized fluid to hydraulic wheel motors 125 for acceleration of the vehicle. The hydrostatic operation of the vehicle is well known in the prior art. A suitable hydrostatic drive system is shown in U. S. Pat. No. 4,098,144, which is hereby incorporated by reference.

When the hydraulic motors 125 are used as brakes, the fluid is then used to add kinetic energy back into the flywheel 20.

A generator 100 is located on shaft 15. The generator 100 is primarily used to supply supplemental vehicle power, such as lights and heat blowers, while the vehicle is in use. When the vehicle arrives at its destination, the generator 100 depletes the kinetic energy from the spinning flywheel 20 and recharges the batteries 25.

It should be noted that batteries 25 store electrical energy while the hydraulic accumulators of device 120 store hydraulic energy. During the operation of the vehicle, when the flywheel is up to speed, its kinetic energy is primarily used to generate hydraulic power for propulsion rather than to charge the batteries with the generator. Reserve hydraulic power is available from hydraulic accumulators.

Referring now specifically to FIG. 2, the flywheel 20 is shown from the top. The batteries 25 are suspended in pivoted battery box cages 26. A grommet 18 is shown which absorbs vibrational energy from flywheel 20 and allows flexing. In order to balance the flywheel 20 a series of masses 146 are provided which can be moved radially into optimum position by stepper motors 140. The stepper motors 140 turn a power screw 142 thus propelling the masses 146 both inward or outward in their housing 144. A suitable control mechanism for sending the appropriate signals to the stepper motors may be seen in FIG. 4, described later.

Referring now to FIG. 3, battery 25 is shown suspended in the pivoted battery box cages 26. The battery 25 is suspended in the battery box cage 26 from a rod 28 which permits the cage 26 to pivot. As the flywheel 20 begins spinning, the battery 25 will be pivotally swung outward by the centrifugal acceleration. As this occurs the balance of the flywheel 20 may be altered thus requiring correction by the movable masses 140 shown in FIG. 2. Also, the weight of the batteries will vary with their state of charge. This is another reason the automatic flywheel balancing weights are needed.

The main reason for the pivoted support of the batteries, however, is to allow the use of conventional wet cell automotive batteries in the device. As the flywheel rotates, the batteries swing about shaft 28 to such an angle so as to just offset the effect of centripetal acceleration. To the fluid in the batteries, the battery remains apparently level and no sloshing or spillage will occur. It should be recognized that the specific battery box pivot arrangement is shown here only schematically and may be altered in many ways. For example, it is contemplated that the battery boxes could be suspended from trunnions on each side of the box rather than hung from a shaft. The only requirement for satisfactory operation of such trunnions would be that they be located above the center of gravity of the battery so the bottom of the battery would swing outward during flywheel rotation.

Figure 4:
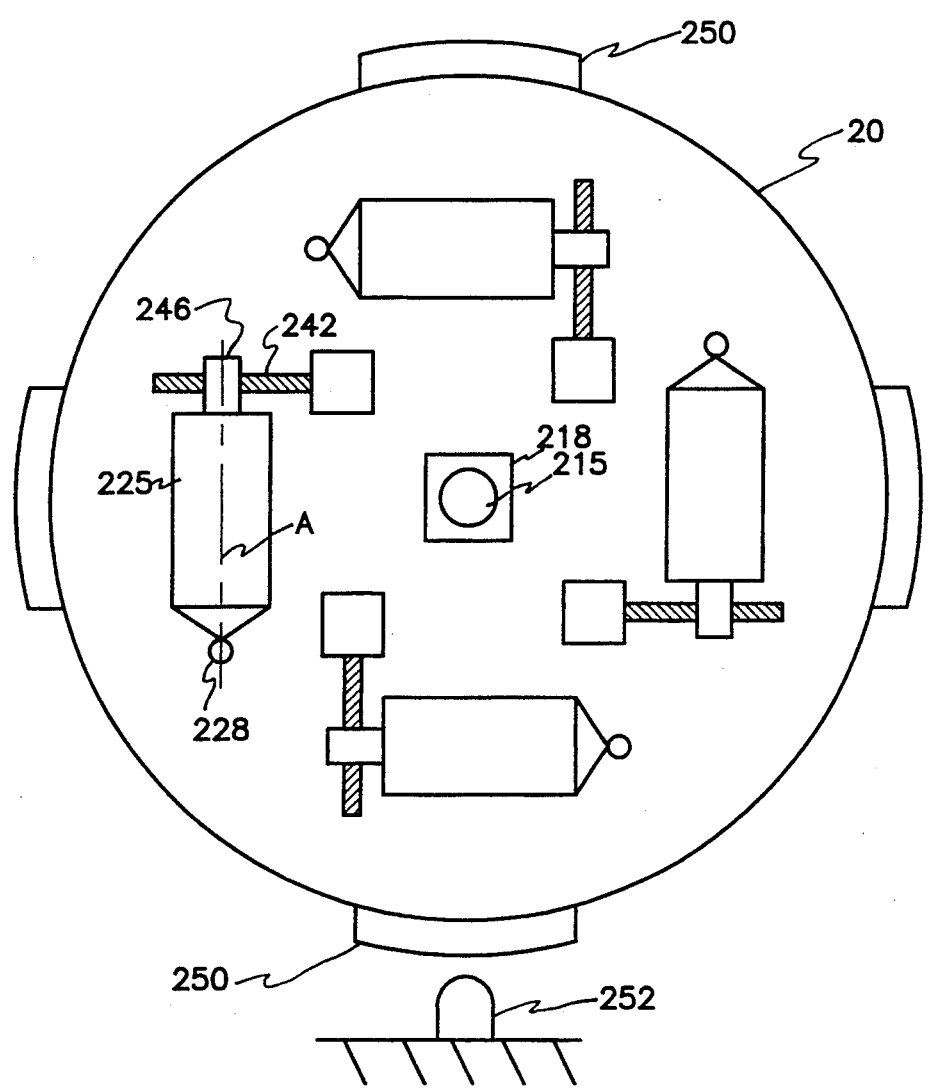
FIG. 4 is a top view of a second embodiment of the battery flywheel illustrating a technique for self balancing the battery flywheel of the invention.

Referring now to FIG. 4 the automatic flywheel balance control will be described as well as an alternate battery support means. Conductive ring segments 250 are arranged at numerous locations around the circumference of the flywheel 20. The top of the flywheel shaft 215 is mounted in a hard rubber grommet which will allow a slight deflection of the shaft to occur in response to any out of balance condition of the flywheel. For example, if the bottom portion of the flywheel is heavy the shaft will deflect so as to cause the lower conductive ring to come into contact with carbon brush 252. This will complete a circuit (not shown) causing lower motor 240 to turn its screw 242 in a direction to pull its associated battery casing 225 inwardly thus reducing the effective weight of the flywheel at the bottom. Similar carbon contact points are arranged all around the flywheel. Continued dynamic adjustment of each battery position is thus accomplished. Although not shown in FIG. 2, such a conductive ring and carbon contact arrangement could also be used to adjust the movable weights 146 in that version of the flywheel.

The battery support means of FIG. 4 are different from that described with respect to FIG. 2 because the batteries themselves are used as the adjustment weights for the flywheel. Concentrating specifically on the left battery arrangement as seen in FIG. 4, the stepper motor 240 is used to turn screw 242 as commanded by signals picked up from carbon brushes 252. Screw 242 turns through ball nut 246 to rotate the battery case about an axis normal to the paper at universal joint 228. This moves the top (as seen in FIG. 4) of the battery case 225 slightly outwardly or inwardly to provide balancing for the flywheel as previously described. Battery case 225 is also journaled to ball nut 246 and universal joint 228 so as to be rotatable about axis A. Axis A passes through the battery on a line above its center of gravity so that the battery will swing outwardly as the flywheel rotates in a manner similar to that described with respect to FIG. 2. As previously described, this allows liquid electrolyte batteries to be used.

In operation, electric motor 60 uses stored electrical energy in the batteries to spin the flywheel up to a predetermined maximum speed. Once this speed is attained the electrical power is cut off allowing the flywheel to free wheel until its speed is diminished to a predetermined minimum speed at which time the battery current is again sent to the electric motor. Such speed controls are old and well known in the electric motor art and further description need not be given here. The free wheeling flywheel represents a tremendous source of reserve power which may be drawn upon from time to time as vehicle needs dictate. Contrast this to the standard electric vehicle wherein short burst power requirements require large amounts of electrical current and very heavy electric drive motors. The inclusion of the flywheel in the system serves to absorb the peak power requirements for the system thereby leveling the load on the batteries. The most significant peaks in power occur when the vehicle is accelerated. Such peak power excursions can significantly reduce the capability of a battery to deliver energy. The energy stored in a battery is delivered at an optimum efficiency when battery energy is withdrawn without extreme power peaks. By augmenting the drive system with a mechanical flywheel the peak power, usually withdrawn from the battery, can be supplied by the flywheel thereby load leveling the battery.

In this invention a hydraulic source of reserve energy is also used to further level the load on the battery and to serve as the main storage location for regenerative energy returned to the system during braking. The flywheel shaft power is connected to the main pump of a hydrostatic drive system for the vehicle wheels. The hydrostatic drive system is equipped with conventional pneumatic accumulators for storing reserve hydraulic energy. When a hydraulic wheel motor calls for a burst of power, the pneumatic accumulators respond first with their supply of pressurized fluid. This hydraulic reserve power source will be sufficient for relatively short power burst requirements. When the hydraulic accumulator source of reserve energy is exhausted, and still more is required, the main hydraulic pump kicks in to supply more hydraulic power. The main hydraulic pump is driven by the flywheel shaft and thus depletes some of its mechanical energy storehouse. The flywheel shaft energy should provide enough reserve energy to accelerate the vehicle to high speed from a standing start at least once without reducing its speed below the bracket speed where the main electric motor kicks in. Eventually a period of low wheel motor power requirements will be reached, such as when the vehicle is up to speed and coasting. Then, the electric motor may be kicked in to replenish the flywheel speed and the hydraulic motor may be kicked in to recharge the hydraulic accumulators.

This dual reserve system of peak power leveling leads to a very even and non-demanding current flow requirement for the batteries. This promotes high battery efficiency and long life.

Frictional losses incurred by the flywheel are reduced by the magnetic levitation system. In addition, it is contemplated that other exotic types of flywheel energy efficiency optimization could be used. For example a flywheel vacuum chamber could be used. It is not thought that these exotic improvements should be necessary since a major source of weight in an electric vehicle (the batteries) has been converted into both a chemical and mechanical source of energy by the inclusion of the batteries as a rotating mass on the flywheel.

It is apparent from the above that the present invention accomplishes all of the objectives set forth by providing a new and improved flywheel battery for an electric vehicle having magnetic levitation and a hydraulic drive system.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be by most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily recognize that a compressed air system could replace the hydrostatic drive if desired.

It is to be understood that the present invention is not limited to the sole embodiment described above, but encompasses any and all embodiments within the scope of the following claims:

I claim:

1. An energy storage and generation system for an electric vehicle comprising:
   a shaft, mounted in support frame means;
   an electric motor means, said electric motor means including an electric motor for rotating said shaft;
   a flywheel means for providing rotational kinetic energy mounted to and driven by said shaft, said flywheel means including a plurality of batteries for powering and electric motor means,
   said batteries secured atop said flywheel means and adding rotating mass to said flywheel means,
   a main hydraulic pump means mounted to and driven by said shaft,
   a hydraulic wheel motor means, said hydraulic wheel motor means in hydraulic communication with said hydraulic pump means, and said hydraulic wheel motor means further being mechanically to a drive wheel of a vehicle.

2. The energy storage and generation system of claim 1 wherein said electric motor is powered by said batteries.

3. The energy storage and generation system of claim 2 further comprising;
   electrical generator means driven by said shaft for generating supplemental electrical energy for the vehicle.

4. The energy storage and generation system of claim 3 wherein said flywheel means includes a first permanent magnet mounted to said flywheel means, a second permanent magnet mounted to said support frame, said first permanent magnet and said second permanent magnet being arranged in polar opposition so as to induce magnetic levitation of said flywheel and said batteries.

5. The energy storage and generation system of claim 4 wherein a dynamic balancing means is provided for said flywheel means.

6. The energy storage and generation system of claim 5 wherein said balancing means include battert support means which permit said batteries to rotate in said battery support means in response to the rotation of said flywheel means.

7. The energy storage and generation system of claim 5 wherein said balancing means includes weights, said weights being mounted on said flywheel means and arranged for variable radial motion, wherein said weights variable radial motion imparts balance to said flywheel means.

8. The energy storage and generation system of claim 1 wherein said hydraulic wheel motor means includes hydraulic control means comprising;
   a fluid reservoir, said fluid reservoir connected to said pump means,
   a control valve, said control valve intermediate said fluid reservoir and said pump means,
   a hydraulic accumulator means, said hydraulic accumulator means for storing hydraulic energy and located proximal to said fluid reservoir,
   said pump means, said fluid reservoir, said control valve and said hydraulic accumulator means being interconnected by a hydraulic pipe system.

9. The energy storage and generation system of claim 8 wherein said hydraulic wheel motor means drives a wheel motor means of the vehicle.

10. An energy storage and generation system for an electric vehicle comprising:
    a shaft, said shaft mounted in a support frame means;
    an electric motor means, said electric motor means including an electric motor for rotating said shaft;
    a flywheel means for providing rotational kinetic energy mounted to and driven by said shaft, said flywheel means including a plurality of batteries for powering said electric motor means,
    said batteries mounted atop said flywheel means and adding mass to said flywheel means,
    a magnetic levitation means, said magnetic levitation means located on said flywheel means and said support frame means wherein said magnetic levitation means suspends said flywheel means by magnetic force to permit free rotation of said flywheel means.

* * * * *